United States Patent [19]
Haack et al.

[11] Patent Number: 6,167,337
[45] Date of Patent: Dec. 26, 2000

[54] RECONFIGURABLE CONTROL UNIT FOR WORK VEHICLES

[75] Inventors: Paul W. Haack, Crystal Lake; Kurt D. Michl, Homewood, both of Ill.

[73] Assignee: Case Corporation, Racine, Wis.

[21] Appl. No.: 09/165,977

[22] Filed: Oct. 2, 1998

[51] Int. Cl.[7] .................................................. G06F 7/70
[52] U.S. Cl. ............................ 701/50; 701/1; 701/24; 701/32; 222/63
[58] Field of Search ................................. 701/50, 1, 32, 701/24; 222/63

[56] References Cited

U.S. PATENT DOCUMENTS

| | | | |
|---|---|---|---|
| 4,296,409 | 10/1981 | Whitaker et al. | 340/684 |
| 4,376,298 | 3/1983 | Sokol et al. | 364/551 |
| 4,462,079 | 7/1984 | Ito et al. | 364/442 |
| 4,551,801 | 11/1985 | Sokol | 364/424 |
| 5,184,312 | 2/1993 | Ellis | 364/551.01 |
| 5,374,917 | 12/1994 | Hoffman et al. | 340/438 |
| 5,613,352 | 3/1997 | Panoushek et al. | 56/10.2 E |
| 5,687,081 | 11/1997 | Wellman et al. | 364/424.07 |
| 5,884,205 | 3/1999 | Elmore et al. | 701/50 |
| 5,897,600 | 4/2000 | Elmore et al. | 701/50 |

OTHER PUBLICATIONS

"1998–1999 Precision Agriculture Buyer's Guide", 1–page advertisement on p. 37 for the Fieldstar Precision Farming System, DataTouch™ Command Center Terminal.

"The Intelligent Revolution in Agriculture", Geo Tec Electronics GmbH, 6–page brochure.

"Precision Farming, The Terminals GT 2000 and GT 2000 NT", Geo Tec Electronics GmbH, 2–page Ternical Data Sheet.

*Primary Examiner*—William A. Cuchlinski, Jr.
*Assistant Examiner*—Arthur D. Donnelly
*Attorney, Agent, or Firm*—Foley & Lardner

[57] ABSTRACT

A reconfigurable control unit is disclosed for providing an operator interface to control units on different types of work vehicles, such as, tractors, combines, sprayers, etc. The reconfigurable control unit stores a plurality of application programs in a memory and selects only the application program needed depending on the work vehicle type that the reconfigurable control unit is coupled to. The type of work vehicle to which the reconfigurable control unit is coupled to is determined based upon a unique configuration message received from a controller on the work vehicle. The work vehicle type may also be determined by scanning a data bus connector that couples the reconfigurable control unit to the work vehicle, or by soliciting operator input to determine which type of work vehicle the reconfigurable control unit is coupled to.

33 Claims, 6 Drawing Sheets

RECONFIGURABLE CONTROL UNIT FOR WORK VEHICLES

FIELD OF THE INVENTION

The present invention relates generally to control units for agricultural or construction vehicles, and more specifically to control units that are reconfigurable for use with any of a plurality of work vehicles adapted to perform different types of work.

BACKGROUND OF THE INVENTION

In the fields of agricultural and construction vehicles, the number of electronic controls and systems has increased exponentially in recent years. For example, today's agricultural tractors include planter controllers, insecticide and herbicide controllers, and global positioning system (GPS) equipment, while today's agricultural combines include yield monitors, GPS equipment and sensors for monitoring the harvested crop. Each new electronic system typically includes a unique operator interface unit for displaying parameters and receiving operator input.

One problem with this increase in electronic controls is that the cab of the vehicle becomes cluttered with a plethora of controllers, boxes, user interfaces, etc. The need to operate these multiple controls can be confusing to the operator, and the increase in the number of controls increases the probability of time-consuming electrical problems in the cab.

A second problem with prior agricultural and construction vehicle systems arises from the fact that operators are demanding more operator-friendly interfaces such as touch screen technology and full color liquid crystal displays (LCD). These interfaces involve costly technology. Adapting these interfaces for the rugged applications of agriculture and construction only increases the cost. Redundancy of interface equipment has been a costly limitation of prior art agricultural and construction vehicle systems.

Yet another problem with prior systems relates to operator training. Even the most operator-friendly interface involves a learning curve while the operator gets accustomed to selecting desired options, flipping through menus or folders, storing data to storage media, etc. In prior systems, each new controller has a different user interface, requiring a new learning curve for the operator.

One prior art attempt to overcome the above limitations is a combine performance monitor that may be customized for operation with any of a number of combines. The customization process, however, is a time-consuming and complex three-level process requiring the farm equipment dealer, or the farmer if the farmer is sufficiently skilled, to enter parameters corresponding to various combine-specific characteristics. Also, the combine performance monitor may only be used on other combines, not on work vehicles designed to perform different types of work (e.g., tractors, sprayers, etc.).

Thus, what is needed is a reconfigurable control unit to overcome these and other problems and limitations of the prior art.

SUMMARY OF THE INVENTION

These and other needs are accomplished by the present invention in which, according to one embodiment, a reconfigurable control unit is provided for selectively providing an operator interface for different work vehicles. The different work vehicles perform different types of work and each includes at least one work controller. Each work controller sends a unique configuration message on a data bus supported by the respective work vehicle. The reconfigurable control unit includes a data bus interface, a memory, a processor and an operator interface. The processor receives the unique configuration message from the data bus, determines which type of work vehicle the control unit is mounted on based upon the received configuration message, and selects from the memory an application program appropriate for the determined work vehicle. The reconfigurable control unit also includes an operator interface including various work vehicle inputs and outputs, these inputs and outputs being defined at least partly by the selected application program.

According to another embodiment of the present invention, a reconfigurable control unit as described above provides a command and display interface for either an applicating vehicle (e.g., a tractor pulling a planter) or a harvesting vehicle (e.g., a combine) adapted to apply a farming input to an agricultural field and to harvest a crop from an agricultural field, respectively.

According to yet another embodiment of the present invention, a reconfigurable control unit is provided for selectively providing an operating interface for different types of work vehicles. The reconfigurable control unit includes a data bus interface, a memory, a processor and an operator interface. The processor determines which work vehicle type the control unit is mounted on and selects an application program based upon that determination. The operator interface includes various operator input devices and a display device, these devices being defined at least in part by the selected application program.

According to yet another embodiment of the present invention, a reconfigurable control unit is provided for selectively providing an operator interface for different types of work vehicles. The reconfigurable control unit includes bus interface means for interfacing the control unit to a bus on each of the work vehicles, memory means for storing various application programs suitable for use with the different types of work vehicles, means for determining which type of work vehicle the control unit is mounted on, means for selecting an application program based upon the determined work vehicle and means for interfacing with an operator. The operator interface means includes input devices and a display device, the input devices and the display device being defined at least partly by the selected application program.

One feature of the present invention is the reduction in the number of costly redundant operator interfaces needed by the operator or owner of a fleet of different types of work vehicles by combining the operator interfaces needed for the different types of work vehicles into one reconfigurable control unit which may be selectively installed within each type of work vehicle.

Another feature of the present invention is the combination of a plurality of control systems into a single control system to reduce the clutter of a plethora of controllers, boxes, graphic user interfaces, etc. in the cab.

Yet another feature of the present invention is a reconfigurable control unit that may be used on a tractor during planting season and also may be used on a combine during harvesting season.

BRIEF DESCRIPTION OF THE DRAWINGS

The features of the present invention which are believed to be novel are set forth with particularity in the appended claims. The invention itself, however, together with further advantages and features thereof may best be understood by one skilled in the art with reference to the following detailed description when taken in conjunction with the accompanying drawings in which like reference numerals refer to like elements, and in which:

FIGS. 6A–6B are alternative embodiments of structures and methods for determining which work vehicle the reconfigurable control unit is located on.

DETAILED DESCRIPTION OF THE PREFERRED EMBODIMENTS

Figure 1:
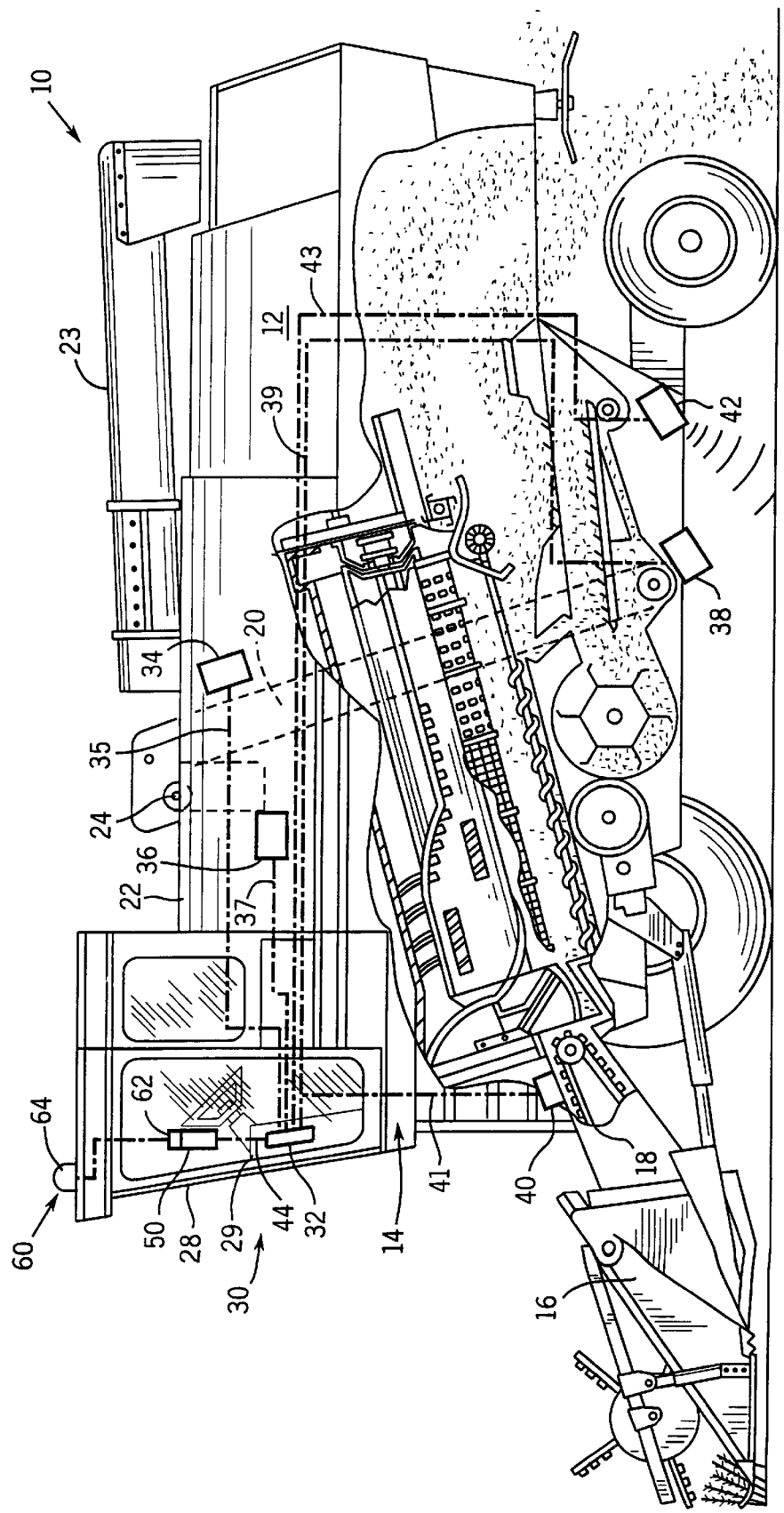
FIG. 1 is a diagram of a harvesting vehicle (e.g., a combine) equipped with a harvest monitor system.

Referring first to FIG. 1, a harvest vehicle 10 equipped with a harvest monitor system 30 is shown. Harvest vehicle 10 is, for example, a combine such as the 2100 S Series of axial-flow combine made by Case Corporation of Wisconsin. Harvest vehicle 10 includes a body 12, a cab 28 and a threshing and separating assembly 14 coupled to body 12. Threshing and separating assembly 14 receives the crop (e.g., wheat, corn) being harvested from a header 16 via a feeder 18. Once the crop is separated from the waste materials (e.g., chaff, tailings, straw and other wastes) by threshing and separating assembly 14, the clean grain travels up a clean grain elevator 20 to a grain tank 22 or to an unloading auger 23 for discharge into a grain cart (not shown).

Harvest monitor system 30 includes a harvest work controller 32, a grain flow sensor 34, a moisture sensor 36, an elevator speed sensor 38, a header height sensor 40, and a ground speed sensor 42. Grain flow sensor 34 is preferably an impact-type mass flow rate sensor attached to a steel plate struck by grain passing through clean grain elevator 20 which measures the force of the grain. Grain flow sensor 34 generates a grain flow signal indicative of the grain flow rate and transmits this grain flow signal via a bus 35 to harvest work controller 32. Moisture sensor 36 is a capacitive-type sensor mounted on the underside of a grain tank loading auger 24 to measure the moisture content of the grain passing near sensor 36, and may include a grain temperature sensor to temperature compensate the signals. Moisture sensor 36 generates a moisture signal indicative of the moisture content of the clean grain and transmits the moisture signal via a bus 37 to harvest work controller 32. Elevator speed sensor 38 is a velocity sensor that measures the velocity of clean grain elevator 20. Elevator speed sensor 38 generates an elevator speed signal indicative of the elevator speed and transmits the elevator speed signal via a bus 39 to harvest work controller 32. Header height sensor 40 is coupled to header 16 and is a position sensor for indicating the position of header 16 relative to harvest vehicle body 12. Header height sensor 40 generates a header height signal indicative of this position and transmits the header height signal via a bus 41 to harvest work controller 32. Harvest work controller 32 may calculate the position of header 16 relative to the ground 26 using the header height signal. Ground speed sensor 42 is a radar-type sensor for sensing the speed of harvest vehicle 10 as it travels across ground 26. Ground speed sensor 42 generates a ground speed signal indicative of the speed of harvest vehicle 10 and transmits the ground speed signal via a bus 43 to harvest work controller 32.

Harvest work controller 32 is preferably located in a control panel 29 in cab 28 of harvest vehicle 10. Harvest work controller 32 performs calculations and monitoring functions relating to harvesting a crop with harvest vehicle 10. For example, controller 32 converts the grain flow signals into yield data by first calculating the distance traveled by harvest vehicle 10 by multiplying the harvest vehicle's speed (as measured by ground speed sensor 42) by elapsed time, which may be generated internally by a microprocessor or other time generation device.

The yield (e.g., bu/acre) is then determined by dividing the quantity of sensed grain (e.g., bu) by the area of the field harvested (e.g., acres), where the quantity of sensed grain is the product of the grain flow rate and time, and the area harvested is the product of the width of cut and distance traveled. Various other harvest information may be generated, calculated and stored by harvest work controller 32 for display to an operator or for later recall from a storage device.

Harvest monitor system 30 also includes a reconfigurable control unit 50 for selectively providing an operator interface for harvest vehicle 10 when control unit 50 is installed on harvest vehicle 10. Reconfigurable control unit 50 communicates with harvest work controller 32 via a data bus 44. Reconfigurable control unit 50 includes input devices and a display device for providing various operator input and output functions. For example, reconfigurable control unit 50 may display instantaneous grain yield, total grain yield for a field, grain moisture content, error messages relating to harvest vehicle 10, and other data. Additionally, reconfigurable control unit 50 may perform some or all of the calculations and monitoring functions performed by harvest work controller 32. In this alternative embodiment, harvest work controller 32 would primarily serve as an interface between sensors 34, 36, 38, 40 and 42 and reconfigurable control unit 50.

In one embodiment, reconfigurable control unit 50 includes an active-matrix liquid crystal display using touchscreen technology to interface with the operator. Reconfigurable control unit 50 may also include discrete input devices (e.g., switches), and a cathode ray tube display (CRT), flat screen LCD, or other display device. The display device preferably displays full-motion video in a number of colors under varying ambient light conditions.

Figure 2:
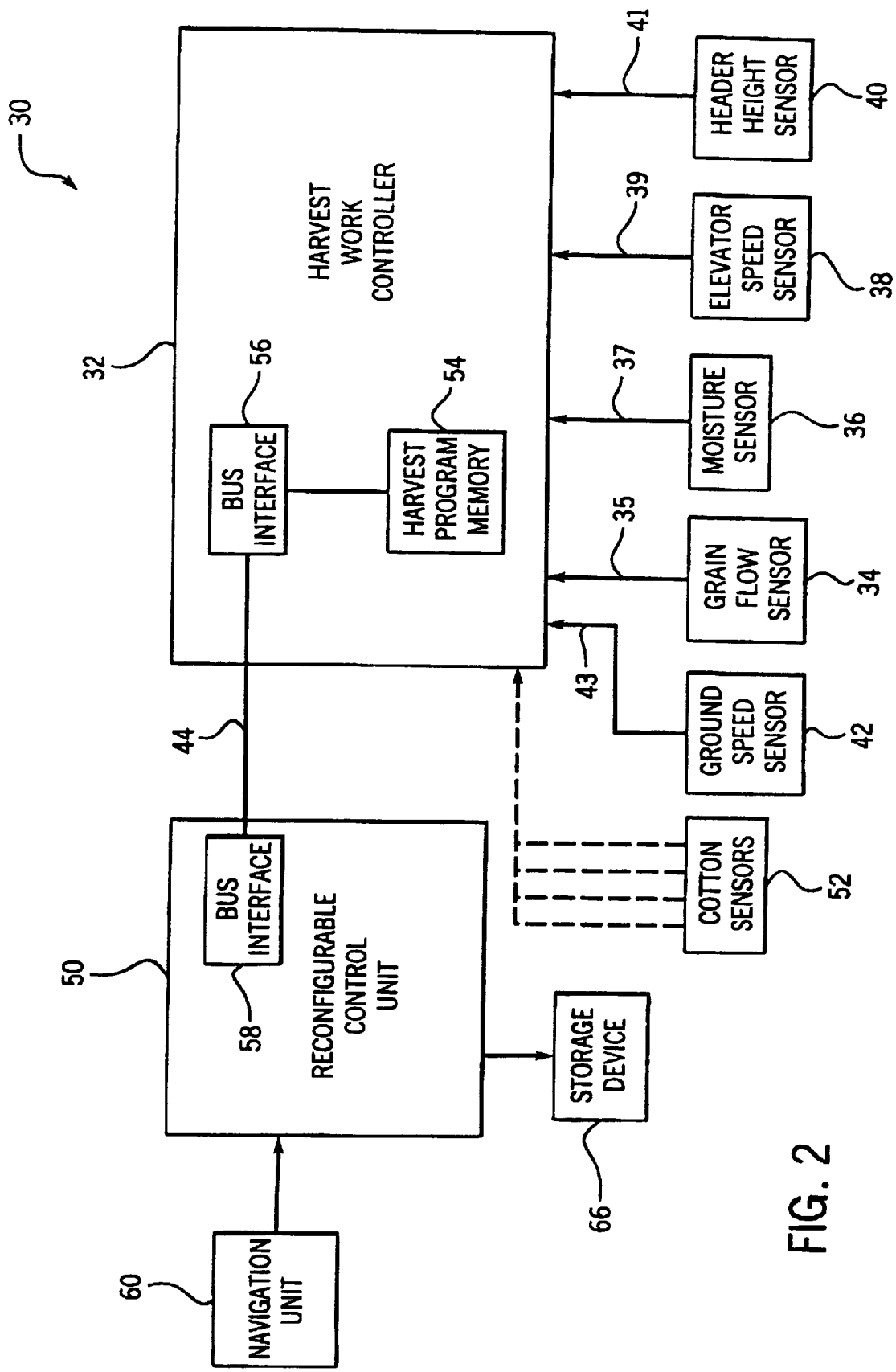
FIG. 2 is a block diagram of the harvest monitor system of FIG. 1.

Referring to FIG. 2, a block diagram of harvest monitor system 30 including harvest work controller 32 and reconfigurable control unit 50 is shown. Harvest work controller 32 communicates with the above-mentioned sensors 34, 36, 38, 40 and 42 via respective busses 35, 37, 39, 41 and 43. According to an alternative embodiment, a plurality of cotton sensors 52 may be coupled to harvest work controller 32 for use on a cotton harvesting vehicle (not shown).

Harvest work controller 32 includes a memory 54 for storing a pre-determined application program that controller 32 executes to provide the various harvest performance calculations and functions. Controller 32 also includes a bus interface 56 for communication with data bus 44. Reconfigurable control unit 50 includes a bus interface 58 for communication with harvest work controller 32 via data bus 44. Preferably bus interfaces 56 and 58 include controller area network (CAN) interface chips and data bus 44 is part of a CAN data bus system according to the Society of Automotive Engineering (SAE) J-1939 Bus Standard. Accordingly, other controllers besides controller 32 may also communicate on data bus 44. Bus interfaces 56 and 58 may, however, be any electrical or mechanical interface between harvest work controller 32 and data bus 44 and between reconfigurable control unit 50 and data bus 44, respectively. Data bus 44 may also be any other type of communication network for providing communication between reconfigurable control unit 50 and harvest work controller 32.

A navigation unit 60 may also be provided in communication with reconfigurable control unit 50 or directly with data bus 44 through the use of an additional bus interface chip (not shown). Navigation unit 60 provides location signals to control unit 50 indicating the instantaneous location of harvest vehicle 10. Control unit 50 correlates the location signals received from navigation unit 60 with the yield data received from harvest work controller 32, and stores the correlated yield and location data in a storage device 66 (e.g., a removable memory card). The correlated data can be used by control unit 50 to generate a real-time yield map while harvesting, or can be read from storage device 66 using an external computer to generate an off-line yield map.

Navigation unit 60 includes a global positioning system (GPS) receiver 62 (FIG. 1), with an associated antenna 64, and further may include a differential GPS (DGPS) receiver (not shown) with an associated antenna (not shown). A single antenna may be used in place of antenna 64 and the DGPS antenna. GPS receiver 62 may, for example, be made by Trimble Navigations, Ltd. of California, and the DGPS receiver may be made by Satloc, Inc. of Arizona. GPS receiver 62 determines longitude and latitude coordinates (and may also determine altitude) of the vehicle from signals transmitted by the GPS satellite network. The accuracy of the position is improved by applying correction signals received from the DGPS receiver. The DGPS correction signals may be received from the U.S. Coast Guard or from commercial services, for example, the Omnistar DGPS System from John E. Chance & Associates of Texas. Alternatively, navigation unit 60 may comprise a compass, a gyroscope, and wheel speed sensors along with reference position information to generate the position signal transmitted to reconfigurable control unit 50.

Figure 3:
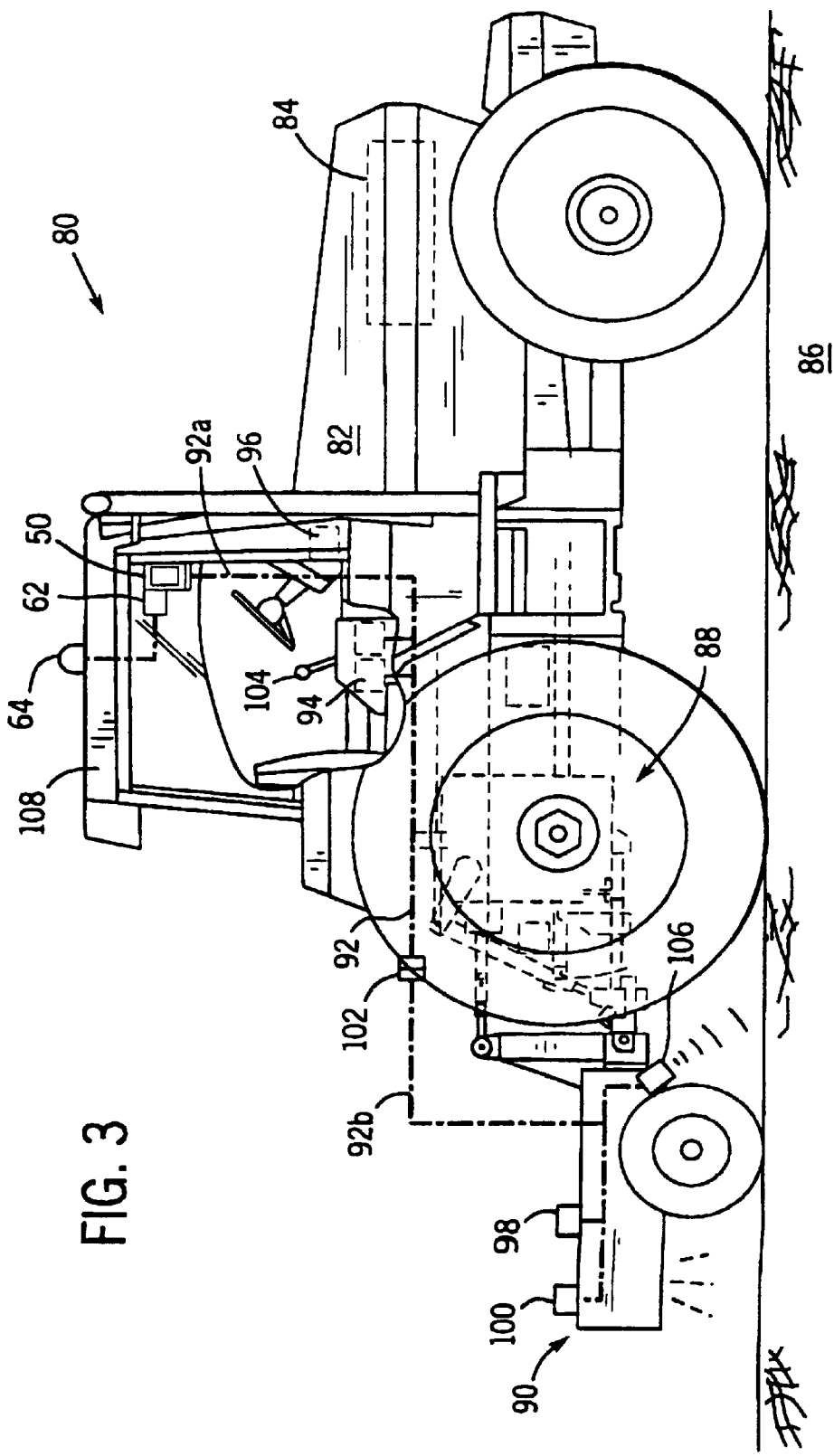
FIG. 3 is a diagram of an applicating vehicle equipped with an application control system.

Referring to FIG. 3, an applicating vehicle 80 (e.g., a tractor) is shown. Applicating vehicle 80 includes a body 82, a cab 108 and an engine 84 for propelling the vehicle across the ground 86. Applicating vehicle 80 includes a hitch assembly 88 for joining applicating vehicle 80 to an implement 90 adapted to apply a farming input to an agricultural field. Implement 90 may be, for example, a planter for planting individual seeds, a drill for drilling masses of seed, a sprayer for spraying a fertilizer, insecticide, herbicide, etc., or any other type of applicating implement. Thus, applicating vehicle 80 performs a different type of work than that performed by harvest vehicle 10.

Applicating vehicle 80 further comprises a data bus 92 having a tractor portion 92a and an implement portion 92b. Data bus 92 is preferably a CAN data bus for providing serial data communication among various controllers coupled to data bus 92. Several exemplary controllers include an armrest control unit 94, an instrument cluster unit 96, a monitor interface unit 98 and a multi-channel controller 100. Data bus 92 further includes a connector 102 for providing communication between tractor bus portion 92a and implement bus portion 92b.

Armrest control unit 94 allows the operator to control the position of the implement by maneuvering lever 104 to control an electrohydraulic assembly in hitch assembly 88 to adjust the position of implement 90. Instrument cluster unit 96 provides certain applicating vehicle output data (e.g., error messages, engine RPMs, engine oil pressure, etc.). Monitor interface unit 98 performs a variety of implement control and sensing functions. For example, monitor interface unit 98 provides feedback from sensors (not shown) located on implement 90, which are configured to sense the application rate of the farming input. Monitor interface unit 98 also provides frame control functions for implement 90 and senses implement status. Monitor interface unit 98 then provides this information selectively on data bus 92 for the use of other controllers on data bus 92. Multi-channel controller 100 controls the rate of application of the farming input by implement 90 by receiving a command rate from data bus 92, determining a variety of the farming input to be applied if desired, and actuating meters on implement 90 to dispense the farming input at the commanded rate. Implement 90 may further include a ground speed radar 106, in communication with bus 92 for providing instantaneous ground speed of implement 90 for use by monitor interface unit 98 and multi-channel controller 100. Ground speed radar 106 may be replaced by a wheel speed sensor for providing the ground speed of implement 90. Also, ground speed radar 106 may be mounted on applicating vehicle 80 instead of implement 90 for providing the ground speed of applicating vehicle 80.

Various input and output functions for applicating vehicle 80 are provided to the operator via instrument cluster unit 96 and/or other controllers in cab 108 of applicating vehicle 80. According to the present invention, however, reconfigurable control unit 50 is provided in communication with data bus 92 for selectively providing an operator interface for applicating vehicle 80. Thus, the number of operator interface functions performed by instrument cluster unit 96 can be reduced or eliminated. Reconfigurable control unit 50 provides various input and output functions for applicating vehicle 80 determined at least partly by an applicating program stored in reconfigurable control unit 50. For example, the operator may determine the command rate (i.e., the rate at which multi-channel controller 100 applies product to the field) through an operator interface portion of reconfigurable control unit 50. Also, the operator may monitor the actual product dispense rates as sensed by monitor interface unit 98.

Reconfigurable control unit 50 may also be coupled to GPS receiver 62, which is coupled to GPS antenna 64, for providing instantaneous location information of applicating vehicle 80 to reconfigurable control unit 50. Additionally, reconfigurable control unit 50 may include a DGPS antenna and receiver for improved accuracy in determining location information for applicating vehicle 80. Control unit can use the location signals as indices to a prescription map for the farming input being applied to the field.

Figure 4:
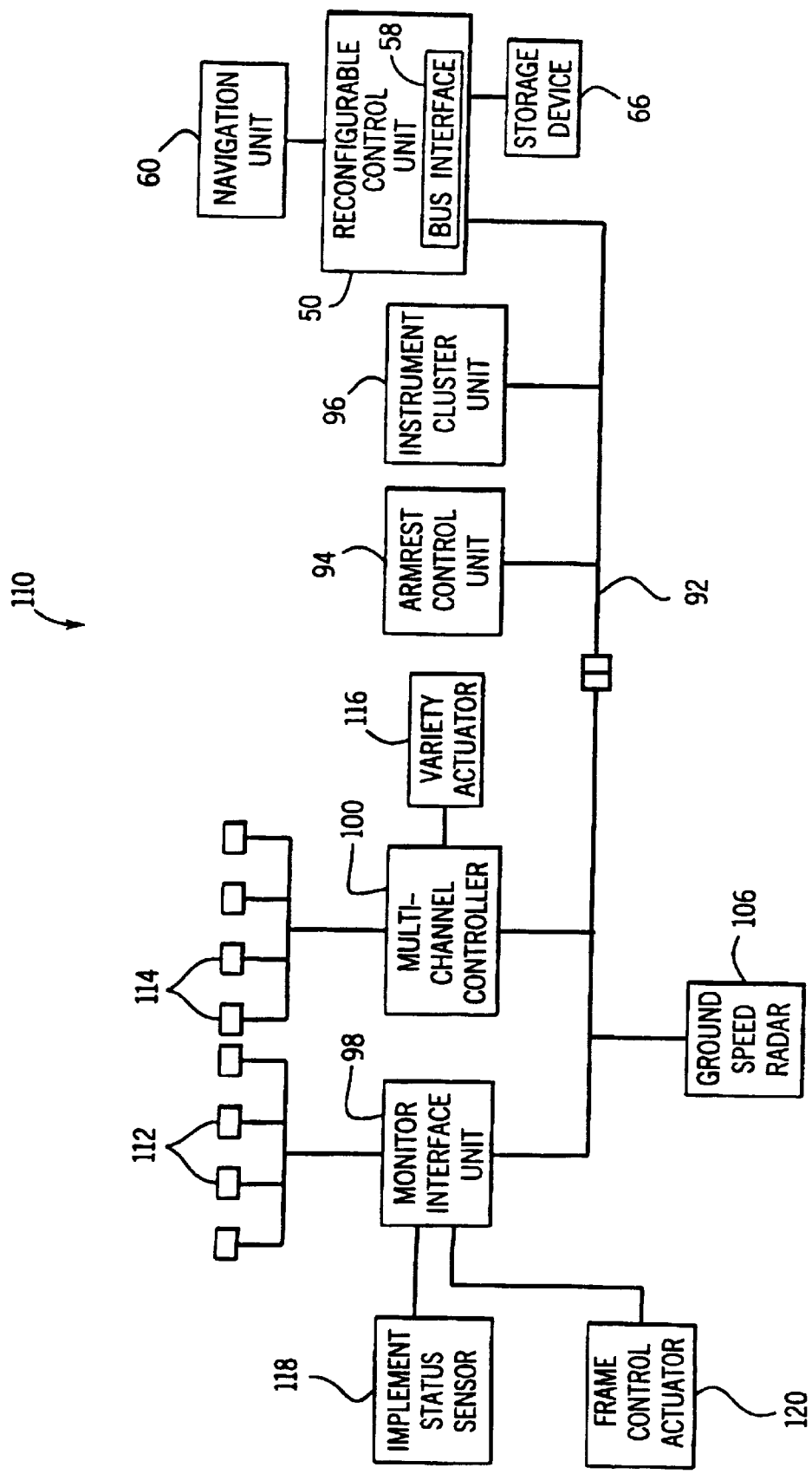
FIG. 4 is a block diagram of the application control system of FIG. 3.

Referring now to FIG. 4, an application control system 110 is shown. Application control system 110 includes reconfigurable control unit 50 and one or more work controllers in communication with reconfigurable control unit 50 via data bus 92. In one embodiment, the work controllers include monitor interface unit 98, multi-channel controller 100, ground speed radar 106, armrest control unit 94 and instrument cluster unit 96, the functions of which have been described hereinbefore. Reconfigurable control unit 50 is coupled to navigation unit 60 and storage device 66. Reconfigurable control unit 50 is further coupled to bus 92 via bus interface 58. Each of work controllers 94, 96, 98, 100 and 106 includes a similar bus interface (not shown) for communicating on bus 92. Application sensors 112 are coupled to monitor interface unit 98 for sensing actual product application rates and transmitting these via bus 92 to the other controllers. Implement actuators 114 are coupled to multi-channel controller 100. Multi-channel controller 100 commands the rates at which implement actuators 114 apply product via rate command signals transmitted from multi-channel controller 100 to implement actuators 114. A variety actuator 116 is coupled to multi-channel controller 100 for selecting the variety of the product to be applied by implement actuators 114 based on variety signals received from multi-channel controller 100. An implement status sensor 118 is coupled to monitor interface unit 98 and provides status regarding the implement position to monitor interface unit 98. Also, a frame control actuator 120 is coupled to monitor interface unit 98 and receives signals from monitor interface unit 98 for controlling the frame of the implement.

Reconfigurable control unit 50 may receive data from work controllers 94, 96, 98, 100 and 106 regarding applicating vehicle 80 performance and may display this information to the operator. Additionally, reconfigurable control unit 50 may receive inputs from the operator and generate command signals to work controllers 94, 96, 98, 100 and 106 based on these operator inputs. Furthermore, work controllers 94, 96, 98, 100 and 106 may communicate with each other via data bus 92 to share data and commands. For example, multi-channel controller 100 may determine the speed of applicating vehicle 80 from data transmitted on bus 92 from ground speed radar 106. Alternatively, multi-channel controller 100 may receive speed signals via bus 92 from reconfigurable control unit 50, which may calculate this speed based upon changes in the location data received from navigation unit 60 over a period of time.

Figure 5:
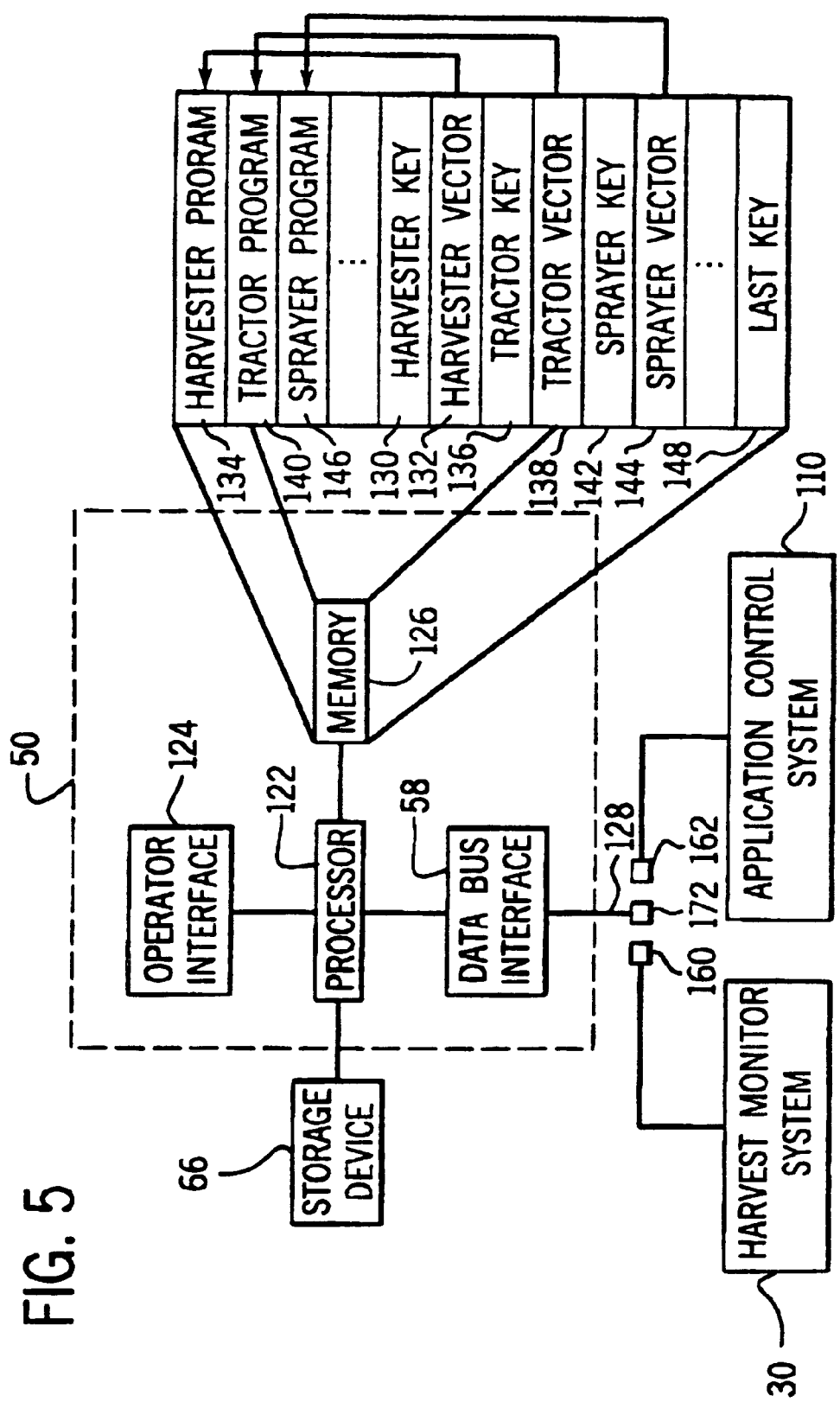
FIG. 5 is a block diagram of a reconfigurable control unit according to one embodiment of the present invention.

Referring now to FIG. 5, reconfigurable control unit 50 is shown in block diagram form including an expanded view of a memory 126 associated with reconfigurable control unit 50. As described below, control unit 50 is capable of determining which type of work vehicle it has been coupled to. Reconfigurable control unit 50 includes a processor 122, an operator interface 124, memory 126, and data bus interface 58. Processor 122 may be any type of digital or analog control electronics (e.g., an Intel or Motorolla microprocessor). Operator interface 124 preferably includes a full color active-matrix liquid crystal display (LCD) using touch-screen technology, but may also include other types of input/output devices, such as a CRT display, light-emitting diodes (LED), buttons, switches, and other input and output devices. Memory 126 may include random access memory (RAM), read-only memory (ROM) or other memory, such as EPROM, EEPROM, flash memory, static RAM, and dynamic RAM or some combination thereof. Memory 126 may also include a magnetic tape storage, floppy disk, or other cartridge-type storage device. Memory 126 includes at least a non-volatile portion with multiple application programs stored thereon.

When the operator connects or mounts reconfigurable control unit 50 to a work vehicle (e.g., an applicating vehicle, a harvest vehicle, a sprayer, etc.) and applies power, one or more work controllers located on the work vehicle sends a configuration message over a bus 128 indicating what type of work vehicle reconfigurable control unit 50 is connected to. This configuration message is received by data bus interface 58 and transmitted to processor 122. Processor 122 decodes the message and compares it to a first key in memory 126 (e.g., a harvester key 130). If the configuration message matches harvester key 130, then processor 122 reads a harvester vector 132 from memory 126 which points to a harvestor application program 134. This match indicates that reconfigurable control unit 50 has been placed on harvest vehicle 10 and further provides processor 122 with an application program designed to be used with harvest vehicle 10. If the configuration message does not match harvester key 130, processor 122 next compares the configuration message to a tractor key 136. If the configuration message matches tractor key 136, processor 122 reads a tractor vector 138 which points to a tractor application program 140. This match indicates that reconfigurable control unit 50 has been placed on a tractor, and further provides processor 122 with an application program 140 designed to provide an operator interface for a tractor. If the configuration message does not match key 136, then processor 122 compares the configuration message to a sprayer key 142. If the configuration message matches sprayer key 142, processor 122 reads a sprayer vector 144, which points to a sprayer application program 146. Processor 122 then utilizes sprayer application program 146 to provide input and output functions for the sprayer vehicle. If the configuration message matches none of the keys stored in memory 126, processor 122 sends a signal to operator interface 124 to display an error message indicating to the operator that reconfigurable control unit 50 does not contain an application program for the vehicle on which the reconfigurable control unit 50 has been placed.

According to another feature of the invention, if reconfigurable control unit 50 matches the configuration message to one of keys 130, 136, or 142, this matched key is stored in a last key memory location 148. Then, upon a subsequent power-up, processor 122 first reads last key 148 and then compares the configuration message to that key first to avoid further delay and processing time. Accordingly, memory location 148 is provided in a writable, non-volatile memory (e.g., battery-backed RAM or EEPROM).

Figure 6A:
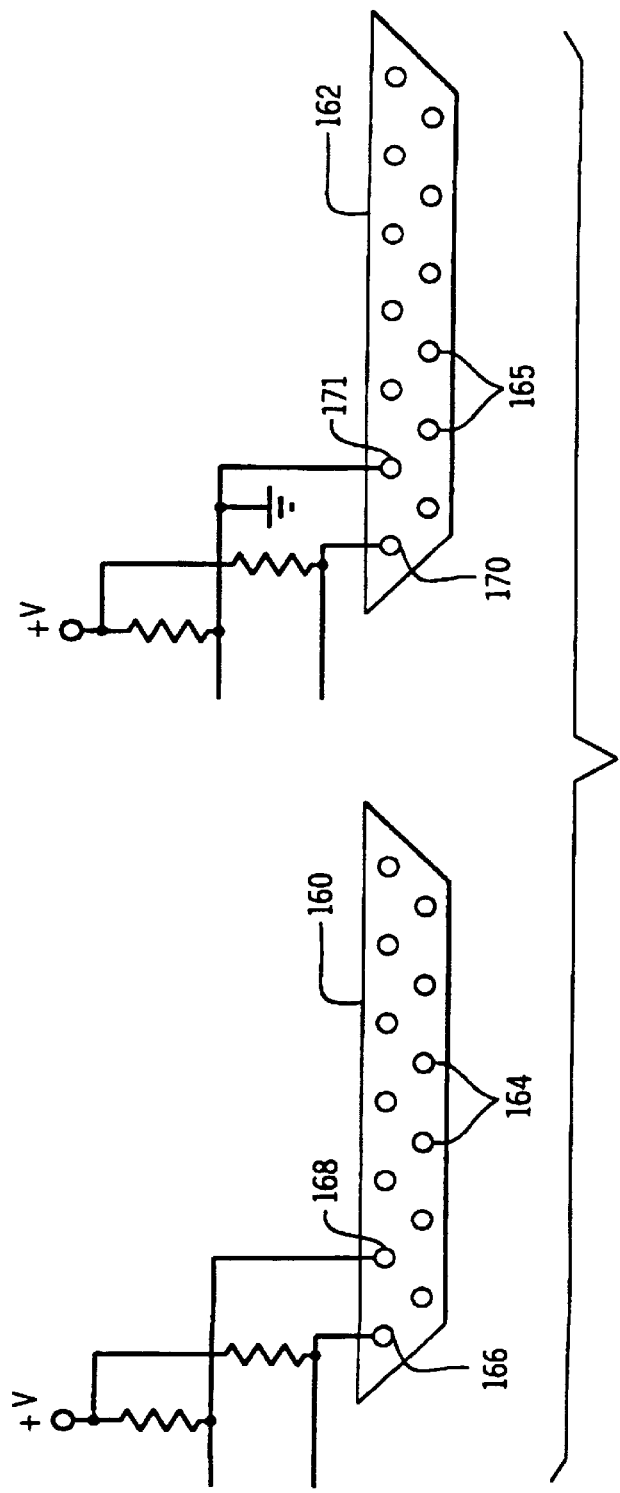
Figure 6B:
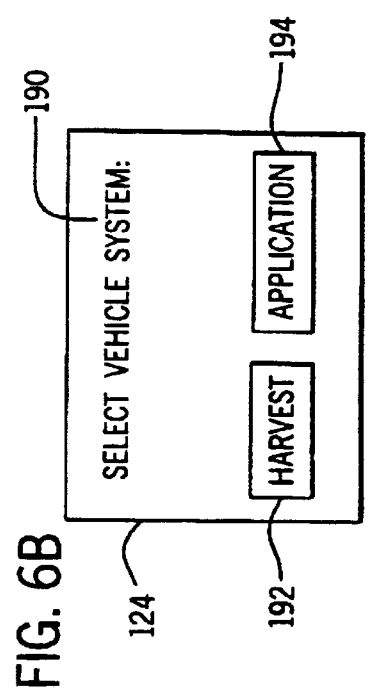

Referring to FIGS. 6A and 6B, alternative embodiments of control unit 50 include other techniques for determining the type of work vehicle that control unit 50 has been mounted on. FIG. 6A discloses two data bus connectors 160 and 162. Data bus connector 160 is coupled to a data bus on a work vehicle of a first type (e.g., to data bus 44 on harvest work vehicle 10), and data bus connector 162 is connected to a data bus on a work vehicle of a second type (e.g., to data bus 92 on applicating vehicle 80). Each of data bus connectors 160, 162 has a plurality of pins 164, 165 to provide a communication link between data bus interface 58 of reconfigurable control unit 50 and the respective data busses 44 and 92 of the work vehicles. As shown in data bus connector 160, pins 166 and 168 are set to a first state (e.g. both pins tied to a logic high in this exemplary embodiment). Referring to connector 162, pins 170 and 171 are tied to a second state (e.g. pin 170 tied to a logic high and pin 171 tied to a logic low in this exemplary embodiment). When data bus interface 58 is coupled to connector 160, processor 122 may read a connector 172 (see FIG. 5) associated with reconfigurable control unit 50 to determine whether pins 166 and 168 are set to the first state or the second state. If pins 166 and 168 are set to the first state, processor 122 will conclude that reconfigurable control unit 50 is coupled to harvest work vehicle 10. Alternatively, if processor 122 determines that pins 166 and 168 are set to the second state, (e.g. as shown with respect to pins 170 and 171), processor 122 will conclude that reconfigurable control unit 50 is coupled to applicating work vehicle 80. Accordingly, with the use of only two pins on data bus connectors 160 and 162, up to four different work vehicle types can be communicated from a work vehicle to reconfigurable control unit 50 by conveying each of the four logic combinations of two pins (e.g., 00, 01, 10 and 11).

Referring to FIG. 6B, upon power-up, processor 122 provides signals to operator interface 124 to display a prompt 190 (e.g. "Select Vehicle System:"). Additionally, processor 122 provides signals to cause the touch-screen display of interface 124 to define two input devices: a harvest button 192 and an application button 194. Thus, the operator may select which work vehicle type the operator has placed the reconfigurable control unit 50 on by pressing either button 192 or button 194. Pressing either button 192 or button 194 will send a signal to processor 122 to indicate which type of work vehicle reconfigurable control unit 50 is coupled to. When processor 122 knows which type of vehicle it is coupled to, processor 122 may execute from memory 126 the associated application program 134, 140 or 146.

Yet another alternative embodiment of control unit 50 includes another technique for determining the type of work vehicle that control unit 50 has been mounted on. In this embodiment, the operator may couple a second memory device (e.g., a removable memory cartridge, a PCMCIA card, etc.) to control unit 50 in addition to storage device 66. Such a memory device would contain an application program (e.g., harvester program 134, tractor program 140, sprayer program 146, etc.) usable by processor 122 of controller 50 as described hereinabove. The memory device could further contain an indication of which work vehicle application program is stored on the memory device. This indication could be provided in the form of a small amount of software that is loaded from the memory device to processor 122 upon power-up. Alternatively, this indication could be provided by a connector on the memory device similar to the technique disclosed above with reference to FIG. 6A where the memory device connector would be configured like data bus connectors 160 or 162. In this embodiment, processor 122 would read the memory device connector to determine which application program the memory device contains.

According to yet a further embodiment of control unit 50, storage device 66 could contain not only an application program (e.g., harvester program 134, tractor program 140, sprayer program 146, etc.) and an indication of which work vehicle application program is stored on storage device 66, but also could be utilized for storing correlated location signals received from navigation unit 60 with data received from control unit 50 (e.g., yield data as disclosed above with reference to FIG. 2). In this embodiment, one storage device (e.g., a removable memory cartridge, a PCMCIA card, etc.) could provide both application program data to control unit 50 for a given work vehicle and also receive and store retrieved data compiled by control unit 50 for a given work vehicle.

It is understood that, while the detailed drawings and specific examples given describe preferred exemplary embodiments of the present invention, they serve the purpose of illustration only. The present invention is not limited to the precise details, methods, materials and conditions disclosed. For example, while a touch-screen operator interface is preferred in the present invention, other types of interfaces utilizing simpler technology may be used to perform operator interface functions. Additionally, while exemplary harvest and application functions have been described as being performed by the reconfigurable control unit of the present invention, additional harvest and application functions may also be performed by reconfigurable control unit 50, and functions for work vehicles other than harvest vehicles and application vehicles may also be utilized. Accordingly, the present invention is not to be limited to any specific embodiment herein, but rather is to extend to all embodiments now known or later developed that fall within the spirit and scope of the present invention as defined by the claims appended hereto.

What is claimed is:

1. A reconfigurable control unit for selectively providing an operator interface for a first and a second work vehicle, the first and the second work vehicles adapted to perform a first and a second type of work as controlled by a first and a second work controller, respectively, each type of work being different, each work controller configured to send a unique configuration message on a data bus supported by the respective work vehicle, the reconfigurable control unit comprising:

a data bus interface removably couplable to the data bus on each of the first and the second work vehicle;

a memory for storing a first and a second application program suitable for use with the first and the second work controller, respectively;

a processor coupled to the data bus interface and the memory, wherein the processor is configured to receive the unique configuration message from the data bus, determine whether the control unit is mounted on the first or the second work vehicle based upon the received configuration message, and select the first or the second application program based upon the determined work vehicle; and an operator interface coupled to the processor and including at least one actuatable input device for generating input signals and at least one display device for generating a visual display, wherein the input signals and the visual display are defined at least in part by the selected application program.

2. The reconfigurable control unit of claim 1, wherein the unique configuration message is a serial data message received from the work controller on the determined work vehicle.

3. The reconfigurable control unit of claim 2, wherein the first work vehicle is a combine, the second work vehicle is a tractor, the first application program is a harvest program and the second application program is an applicating program.

4. The reconfigurable control unit of claim 2, wherein the data bus interface is a controller area network (CAN) interface.

5. The reconfigurable control unit of claim 1, wherein the operator interface includes a touch screen display, the at least one actuatable input device includes a first portion of the touch screen display, and the display device includes a second portion of the touch screen display.

6. The reconfigurable control unit of claim 1, wherein the memory is implemented at least partly by a removable memory cartridge.

7. The reconfigurable control unit of claim 1, further comprising a navigation unit, the navigation unit providing location information to the processor for use with the selected application program.

8. A reconfigurable control unit for selectively providing a command and display interface for an applicating vehicle and a harvesting vehicle, the applicating vehicle adapted to apply a farming input to an agricultural field as controlled by an applicating control unit and the harvesting vehicle adapted to harvest a crop from the agricultural field as monitored by a harvesting control unit, the applicating control unit and the harvesting control unit each configured to send a unique configuration message on a data bus supported by the respective applicating and harvesting vehicle, the reconfigurable control unit comprising:

a data bus interface couplable to the data bus on the applicating vehicle and to the data bus on the harvesting vehicle;

a memory configured to store an applicating program and a harvesting program suitable for use with the applicating control unit and the harvesting control unit, respectively;

a processor coupled to the data bus interface and the memory, the processor configured to receive the unique configuration message from the data bus, determine whether the control unit is mounted on the applicating or the harvesting vehicle based upon the received configuration message, and select the applicating program or the harvesting program based upon the determined work vehicle; and an operator interface coupled to the processor and including at least one actuatable input device configured to generate input signals and at least one display device configured to generate a visual display, wherein the input signals and the visual display are defined at least in part by the selected program.

9. A reconfigurable control unit for selectively providing an operator interface for a first and a second work vehicle, the first and the second work vehicle adapted to perform a first and a second type of work as controlled by a first and a second work controller, respectively, each type of work being different, the reconfigurable control unit comprising:

a data bus interface removably couplable to the first and second work controllers;

a memory for storing a first and a second application program suitable for use with the first and the second work controller, respectively;

a processor coupled to the data bus interface and the memory, wherein the processor is configured to determine whether the control unit is mounted on the first or the second work vehicle, and to select the first or the second application program based upon the determined work vehicle; and an operator interface coupled to the processor and including at least one actuatable input device for generating input signals and at least one display device for generating a visual display, wherein the input signals and the visual display are defined at least in part by the selected application program.

10. The reconfigurable control unit of claim 9, wherein the processor is configured to receive a configuration message from the data bus.

11. The reconfigurable control unit of claim 9, wherein the processor is configured to receive a serial data configuration message via the data bus from one of the first and the second work controllers.

12. The reconfigurable control unit of claim 9, wherein the processor is configured to read a pin configuration from the data bus interface when the data bus interface is coupled to a bus connector on one of the first and the second work vehicles, the bus connector of the first and the second work vehicles having a pin configuration identifying the first and the second work vehicle, respectively.

13. The reconfigurable control unit of claim 9, wherein the processor is configured to receive from the operator interface a configuration signal identifying either one of the first or the second work vehicles.

14. The reconfigurable control unit of claim 13, wherein the processor is configured to generate display signals which, when applied to the display device, cause the visual display to indicate that the first and the second application programs are available.

15. A reconfigurable control unit for selectively providing an operator interface for a first and a second work vehicle, the first and the second work vehicle adapted to perform a first and a second type of work as controlled by a first and a second work controller, respectively, each type of work being different, the reconfigurable control unit comprising:

bus interface means for interfacing the control unit to a bus on each of the first and the second work vehicle;

memory means for storing a first and a second application program suitable for use with the first and the second work controller, respectively;

means for determining whether the control unit is mounted on the first or the second work vehicle;

means for selecting the first or the second application program based upon the determined work vehicle; and means for interfacing with an operator, the operator interface means including at least one actuatable input device for generating input signals and at least one display device for generating a visual display, wherein the input signals and the visual display are defined at least partly by the selected application program.

16. The reconfigurable control unit of claim 15, wherein the determining means comprises a processor configured to receive a configuration message from the first and the second work controller.

17. The reconfigurable control unit of claim 16, wherein the configuration message is a serial data message.

18. The reconfigurable control unit of claim 15, wherein the determining means comprises a processor coupled to the bus interface means, the processor configured to read a pin configuration from the bus interface means when the bus interface means is coupled to a bus connector on one of the first and the second work vehicles, the bus connector of the first and the second work vehicle having a pin configuration representing the first and the second work vehicle, respectively.

19. The reconfigurable control unit of claim 15, wherein the determining means comprises a processor coupled to the operator interface means and configured to receive from the operator interface means a configuration signal identifying one of the first and the second work vehicle.

20. The reconfigurable control unit of claim 19, wherein the processor is configured to generate display signals which, when applied to the display device, cause the visual display to indicate that the first and the second application programs are available.

21. A reconfigurable control unit for selectively providing an operator interface for an applicating vehicle and a second vehicle, the applicating vehicle having a first work controller configured to control the application of a product, the second vehicle having a second work controller configured to perform a function different than the first work controller, the reconfigurable control unit comprising:

a data bus interface removably couplable to each work controller;

a memory for storing a product application program and second program suitable for use with the first and the second work controller, respectively;

a processor coupled to the data bus interface and the memory configured to determine whether the control unit is mounted on the applicating vehicle or the second vehicle and to select one of the product application program and the second program based upon the determined work vehicle; and an operator interface coupled to the processor including a display device configured to generate a visual display, wherein the visual display is defined at least in part by the selected application program.

22. The reconfigurable control unit of claim 21, wherein the second program is a sprayer program.

23. The reconfigurable control unit of claim 21, wherein the second program is a harvest monitoring program.

24. The reconfigurable control unit of claim 21, wherein the processor is configured to receive a unique configuration message from one of the first work controller and the second work controller and to select the one of the product application program and the second program based on the configuration message.

25. The reconfigurable control unit of claim 21, wherein the memory is implemented at least partly by a removable memory cartridge.

26. The reconfigurable control unit of claim 21, wherein the processor is configured to read a pin configuration from the data bus interface when the data bus interface is coupled to a bus connector on one of the application vehicle and the second work vehicle, the bus connector of the application vehicle and the second work vehicle each having a pin configuration identifying the application vehicle and the second work vehicle, respectively.

27. The reconfigurable control unit of claim 21, wherein the operator interface includes a touch screen display.

28. A system for selectively providing an operator interface for a first and a second work vehicle, the first and the second work vehicle adapted to perform a first and a second type of work, each type of work being different, comprising:

a first work controller coupled to the first work vehicle;

a second work controller coupled to the second work vehicle;

a reconfigurable control unit, comprising:

a data bus interface removably couplable to the first and second work controllers;

a memory for storing a first and a second application program suitable for use with the first and the second work controller, respectively;

a processor coupled to the data bus interface and the memory, wherein the processor is configured to determine whether the control unit is mounted on the first or the second work vehicle, and to select the first or second application program based upon the determined work vehicle; and an operator interface coupled to the processor including a display device configured to generate a visual display, wherein the visual display is defined at least in part by the selected application program.

29. The system of claim 28, wherein the operator interface includes an actuatable input device for generating input signals, wherein the input signals are defined at least in part by the selected application program.

30. The system of claim 28, wherein the first program is a product application program and the second program is a harvest monitoring program.

31. The system of claim 28, wherein the processor is configured to receive a configuration message from one of the first work controller and the second work controller, the processor configured to select the first or the second application program based on the received configuration message.

32. The reconfigurable control unit of claim 9, wherein the first work vehicle is a harvester and the first application program is a harvest monitoring program.

33. The reconfigurable control unit of claim 15, wherein the first work vehicle is a harvester and the first application program is a harvest monitoring program.

* * * * *